US010697324B2

(12) United States Patent
Pouzet et al.

(10) Patent No.: US 10,697,324 B2
(45) Date of Patent: Jun. 30, 2020

(54) METHOD OF MANUFACTURING A PART COMPRISING TWO DIFFERENT SUPERALLOYS

(71) Applicant: SAFRAN AIRCRAFT ENGINES, Paris (FR)

(72) Inventors: Sébastien Yohann Pouzet, Avon (FR); Hervé Antoine Frédéric Seince, Samoreau (FR); Jean-François Castagne, Bourg la Reine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 16 days.

(21) Appl. No.: 16/140,096

(22) Filed: Sep. 24, 2018

(65) Prior Publication Data

US 2019/0093510 A1 Mar. 28, 2019

(30) Foreign Application Priority Data

Sep. 25, 2017 (FR) ...................................... 17 58825

(51) Int. Cl.
*C23C 4/123* (2016.01)
*B33Y 10/00* (2015.01)
(Continued)

(52) U.S. Cl.
CPC ............ *F01D 25/24* (2013.01); *B22F 3/1055* (2013.01); *B33Y 10/00* (2014.12); *B33Y 70/00* (2014.12);
(Continued)

(58) Field of Classification Search
CPC . F01D 11/24; F01D 9/04; F01D 25/24; F01D 25/243; F01D 25/246; B23K 26/34;
(Continued)

(56) References Cited

U.S. PATENT DOCUMENTS 7,234,920 B2\* 6/2007 Imbourg .................. B22F 3/15
29/889.2
9,527,162 B2\* 12/2016 Ozbaysal ........... B23K 35/3033
(Continued)

FOREIGN PATENT DOCUMENTS

EP 3 128 129 A1 2/2017
EP 3 133 251 A1 2/2017
(Continued)

OTHER PUBLICATIONS

Search Report as issued in French Patent Application No. 1758825, dated Jun. 5, 2018.

*Primary Examiner* — Michael P Wieczorek
(74) *Attorney, Agent, or Firm* — Pillsbury Winthrop Shaw Pittman LLP

(57) ABSTRACT

A method of manufacturing a superalloy part including a first portion including a majority by weight of a first superalloy and a second portion including a majority by weight of a second superalloy, the second portion extending from the first portion, the method including depositing the second portion on the first portion by a direct metal deposition method, deposition of the second portion including depositing a first layer, then depositing a second layer on the first layer, the first layer including the first and second superalloys, the first layer presenting a content by weight of the first superalloy that is strictly greater than that content by weight of the second layer and strictly less than that content by weight of the first portion, the second layer presenting a content by weight of the second superalloy that is strictly greater than that content by weight of the first layer.

11 Claims, 2 Drawing Sheets

(51) Int. Cl.
    *F01D 25/24*     (2006.01)
    *C22C 1/04*     (2006.01)
    *B33Y 70/00*     (2020.01)
    *B22F 3/105*     (2006.01)
    *C22C 19/03*     (2006.01)
    *B33Y 80/00*     (2015.01)

(52) U.S. Cl.
    CPC ............ C22C 1/0433 (2013.01); C23C 4/123 (2016.01); *B22F 2999/00* (2013.01); *B33Y 80/00* (2014.12); *C22C 19/03* (2013.01); *F05D 2230/23* (2013.01); *F05D 2230/31* (2013.01); *F05D 2300/175* (2013.01)

(58) Field of Classification Search
    CPC .... B23K 26/342; B23K 26/32; B23K 26/323; B33Y 10/00; B33Y 70/00; C23C 4/123; C22C 1/0433
    See application file for complete search history.

(56) References Cited

U.S. PATENT DOCUMENTS

| | | |
|---|---|---|
| 2011/0226390 A1 | 9/2011 | Chen et al. |
| 2015/0132601 A1 | 5/2015 | Bruck et al. |
| 2016/0040555 A1 | 2/2016 | Hayford et al. |
| 2017/0051625 A1* | 2/2017 | Slavens ................ F01D 11/122 |

FOREIGN PATENT DOCUMENTS

| | | |
|---|---|---|
| FR | 3 044 944 A1 | 6/2017 |
| WO | WO 2016/032953 A1 | 3/2016 |

\* cited by examiner

METHOD OF MANUFACTURING A PART COMPRISING TWO DIFFERENT SUPERALLOYS

CROSS REFERENCE TO RELATED APPLICATIONS

This application claims priority to French Patent Application No. 1758825, filed Sep. 25, 2017, the entire content of which is incorporated herein by reference in its entirety.

FIELD

The present invention relates to the general field of methods of manufacturing superalloy parts. The invention applies more particularly, but not exclusively, to manufacturing a superalloy turbine casing, e.g. including an attachment portion for a ring sector or a sealing portion, the attachment portion extending radially towards the inside of the casing.

BACKGROUND

An aviation turbine engine generally includes a so-called "hot" portion, that is situated downstream from the combustion chambers (where "upstream" and "downstream" are defined relative to the flow direction of the gas stream through the turbine engine), which hot portion comprises a high-pressure turbine and a low-pressure turbine. In known manner, the high-pressure turbine includes a high-pressure rotor shaft that drives rotation of a high-pressure compressor that is situated upstream, and the low-pressure turbine includes a low-pressure rotor shaft that drives rotation of a fan and of a low-pressure compressor.

Turbines are defined radially on the outside by respective turbine casings. A turbine casing comprises an annular main portion, which may optionally be sectorized, and it may also include secondary portions forming sealing portions, or attachment portions for a ring sector, e.g. projections, flanges, or hooks, that extend radially from an inside face of the casing towards the inside of the hot gas flow passage. Such secondary portions are subjected to higher temperatures than the main portion of the casing situated at the periphery of the passage. The secondary portions therefore need to be manufactured out of a material that is suitable for withstanding the large thermomechanical stresses to which they are subjected. Requirements in terms of mechanical strength and ability to withstand high temperatures therefore differ between the main portion of the casing and its secondary portions.

In known manner, superalloys, e.g. based on nickel, are used for parts of the turbine. In order to manufacture the above-mentioned casing as a single piece, it is generally necessary to form the annular main portion and the secondary portions out of the same material, and that can be found to be expensive since it is necessary to use the highest performance superalloy for the entire part. Specifically, those high-performance superalloys that are capable of withstanding the temperature inside the passage are generally more expensive and more difficult to work during manufacturing than are superalloys that are sufficient for forming the annular portion of the casing. Also, it is often difficult to use casting to work those high-performance superalloys that withstand the environmental conditions inside the passage.

There therefore exists a need for a manufacturing method that is inexpensive and easy to perform and that makes it possible to obtain a part comprising a plurality of portions made of different superalloys.

SUMMARY

A main aspect of the present invention is thus to mitigate such drawbacks by proposing a method of manufacturing a superalloy part, the part comprising a first portion comprising a majority by weight of a first superalloy and a second portion comprising a majority by weight of a second superalloy different from the first superalloy, the second portion extending from the first portion, the method comprising depositing the second portion on a surface of the first portion by a direct metal deposition method (DMD), deposition of the second portion comprising at least depositing a first layer on said surface, then depositing a second layer on the first layer, the first layer comprising the first and second superalloys, the first layer presenting a content by weight of the first superalloy that is strictly greater than that content by weight of the second layer and strictly less than that content by weight of the first portion, the second layer presenting a content by weight of the second superalloy that is strictly greater than that content by weight of the first layer.

In other words, the second portion comprises the first and second superalloys, and may present a composition gradient between the first superalloy and the second superalloy such that the content by weight of the first superalloy decreases and the content by weight of the second superalloy increases on going away from the surface of the first portion on which the second portion is deposited. The term "direct metal deposition" (DMD) is used to mean a method of additive manufacturing in which a deposition head has a high energy beam (e.g. an electron beam or a laser beam) that encounters a metal wire or a focused stream of metal powder so as to melt the metal and deposit drops of metal as melted in this way in order to form a bath of molten metal on a surface.

Cooling of the bath enables a layer to be formed progressively. The deposition head can move so as to build up the portion of the part that is to be manufactured layer by layer. The DMD method is also known as "direct energy deposition" (DED).

The term "majority by weight" is used to mean a content by weight of at least 50%. In an implementation, the first portion comprises at least 75% by weight of first superalloy or indeed at least 90% by weight. In an implementation, the second portion comprises at least 75% by weight of the second superalloy or indeed at least 90% by weight.

Each of the first and/or second layers may comprise a plurality of sub-layers having identical contents by weight of the first and second superalloys. In particular, the step of depositing the first layer and/or the step of depositing the second layer may each comprise depositing a plurality of sub-layers having identical contents by weight of the first and second superalloys. In other words, a layer may be deposited by performing a plurality of successive passes with a deposition head, each pass enabling a sub-layer to be deposited.

The method of an embodiment of the invention is beneficial in that it makes it possible to obtain a single-piece part having two portions corresponding to different superalloys, and while using the DMD method, which is simple to perform. By way of example, it is thus possible to use a superalloy that is more expensive and that presents better thermomechanical properties for the second portion, and a superalloy that is less expensive and easy to manufacture for the first portion. The method of the invention is made possible in particular because of the presence of the first and second layers in the second portion, which act as matching layers between the first superalloy and the second superalloy. In other words, a composition gradient is present between the first portion and the second portion as a result of the first and second layers. This serves to improve thermomechanical compatibility between the first portion and the second portion. Also, the method of an embodiment of the invention make it possible to use DMD to manufacture a second portion of shape that is complex on a first portion that has already been manufactured, which first portion may also present a shape that is complex.

In an implementation, depositing the second portion may comprise depositing a third layer on the second layer, the third layer presenting a content by weight of the first superalloy that is zero or strictly less than that content by weight of the second layer, and a content by weight of the second superalloy that is strictly greater than that content by weight of the second layer. This enables the composition gradient between the first portion and the second portion to be made even more progressive so as to further improve thermomechanical compatibility between the two portions. Naturally, the second portion could include a greater number of layers, depending on its size and its shape.

In an implementation, the first and second superalloys may be nickel-based superalloys presenting nonzero contents by weight of titanium and of aluminum, the sum of the contents by weight of aluminum and of titanium in the first superalloy being strictly less than 3%, and the sum of the contents by weight of aluminum and of titanium in the second superalloy being greater than or equal to 3%. The term "nickel-based" is used to mean a nickel content by weight in the alloy that is greater than or equal to 50%. The family of the first superalloys satisfying this definition presents the benefit of being less expensive and easier to work than the family of the second superalloys satisfying this definition. However, the family of second superalloys satisfying this definition presents thermomechanical characteristics that are better than those of the family of first superalloys satisfying this definition.

In an implementation, the first superalloy may be a nickel-based superalloy presenting a content by weight of aluminum lying in the range 0.1% to 0.9% and a content by weight of titanium lying in the range 0.5% to 2.5%, and the second superalloy is a nickel-based superalloy presenting a content by weight of aluminum lying in the range 1% to 4.8% and a content by weight of titanium lying in the range 2.6% to 4%.

In general manner, the first superalloy may be of any known type, e.g. based on cobalt, on iron, on titanium, or on aluminum.

In an implementation, the first superalloy may be selected from the following commercial references: C-263, Inconel® 718.

In an implementation, the second superalloy may be selected from the following commercial references: Waspaloy®, Inconel® 738.

In an implementation, during the step of depositing the second portion on the surface of the first portion of the part, the surface may be heated to a temperature lying in the range 400° C. to 800° C. By heating the surface on which deposition is performed in this way, any risk of cracking is reduced and solidification of the metal during the step of depositing the second portion by DMD is better controlled. The temperature should be high enough to avoid cracking due to an excessive temperature gradient, but it should not be too high in order to avoid degrading the superalloy.

In an implementation, the surface of the first portion may be heated by induction. This beneficial provision enables heating to be targeted solely where the second portion is to be deposited on the first portion. By way of example, it is possible to use a circular induction coil positioned close to the surface onto which deposition is to be performed.

The first portion of the part constitutes at least a portion of a gas turbine casing and the second portion of the part may constitute an attachment portion for attaching a ring sector or a sealing portion, the second portion extending radially towards the inside of said casing. In particular, the first portion may constitute a casing that is a single piece or that is sectorized. By way of example, an attachment portion may constitute a flange, a hook, or a projection.

In an implementation, the second portion may be deposited by laser metal deposition (LMD) or by electron beam metal deposition (EBMD).

In an implementation, the first portion of the part may be obtained by casting or by additive manufacturing.

In an implementation, the first portion of the part may be obtained by forging.

In an implementation, the second portion is deposited on the surface of the first portion by using a powder. In particular, in order to form the layers presenting different contents by weight of the first and second superalloys, it is possible to use controlled mixtures of powders. In a variant, it is possible to deposit the second portion by using one or more metal wires.

BRIEF DESCRIPTION OF THE DRAWINGS

Other characteristics and benefits of the present invention appear from the following description made with reference to the accompanying drawings, which show an implementation having no limiting character. In the figures.

DETAILED DESCRIPTION

Figure 1:
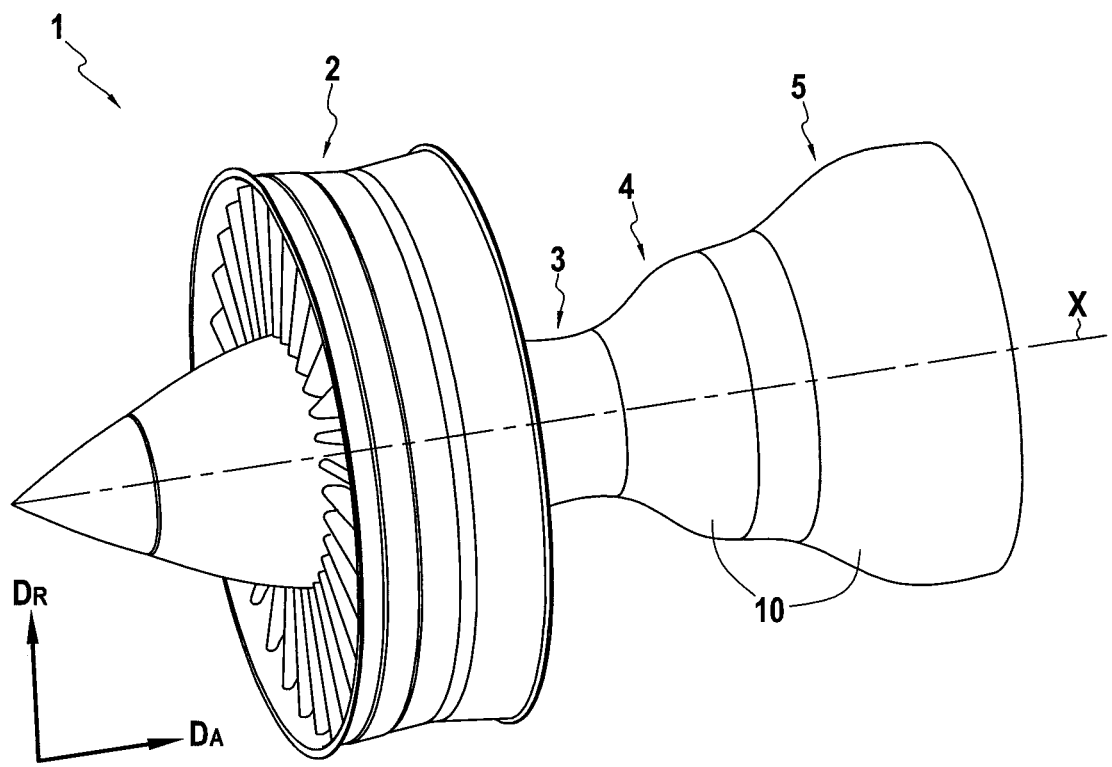
FIG. 1 is a diagrammatic view showing an aviation turbine engine.

FIG. 1 shows in very diagrammatic manner an aviation turbine engine 1, e.g. a bypass turbojet that comprises, from upstream to downstream in the flow direction of the gas stream through the turbine engine: a fan 1 at the inlet of the turbine engine, a compressor 2, a combustion chamber 3, a high-pressure turbine 4, and a low-pressure turbine 5. The high-pressure and low-pressure turbines are coupled respectively to the compressor 2 and to the fan 1 by respective coaxial shafts. The turbine engine 1 is thus centered on an axis X on which the above-mentioned coaxial shafts are also centered. The axial and radial directions DA and DR, and also the relative terms "inner", "outer", and their derivatives, are defined relative to this axis X.

The turbine engine is housed inside a casing comprising a plurality of portions corresponding to different elements of the engine. Thus, each of the high-pressure and low-pressure turbines 4 and 5 is surrounded by a respective turbine casing 10. The present invention is illustrated in its application to manufacturing one of these turbine casings 10. It should be observed that the invention may be applied to any part that requires the use of different materials in different portions of the part that are subjected to different thermomechanical stresses.

Figures 2A, 2B:
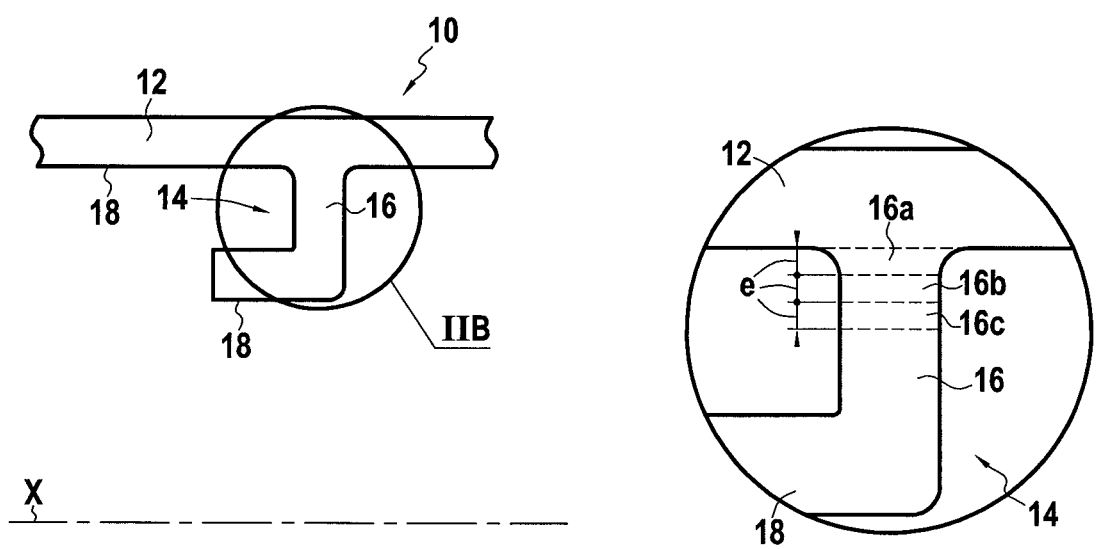
FIGS. 2A and 2B are section views showing a portion of a turbine engine turbine casing obtained by a method in an implementation of the invention.

FIG. 2A is a very diagrammatic section view showing a turbine casing 10 that can be obtained by a method of an embodiment of the invention, e.g. a casing for a high-pressure turbine 4 or a low-pressure turbine 5 of an aviation turbine engine 1 (only half of the casing 10 is shown for reasons of concision). The casing 10 comprises a first portion 12, in this example a wall of annular shape, and a second portion 14 that extends from the first portion 12. In this example, the second portion 14 constitutes a hook on which it is possible to fasten a turbine ring sector or other accessories, for example. The second portion 14 extends radially towards the inside from an inside face 18 of the first portion 12 of the casing. In this example, the second portion 14 comprises a radial portion 16 and an axial portion 18. The first portion 12 of the casing 10 obtained by a method of an embodiment of the invention comprises a majority by weight of a first superalloy, while the second portion 14 of the casing 10 comprises a majority by weight of a second superalloy, different from the first. In this specific example, it can be beneficial to use a second superalloy of higher performance than the first superalloy in terms of withstanding the high temperatures and the mechanical stresses that are imposed in the passage.

In this example, the first superalloy may be a nickel-based superalloy selected from the following commercial references: C-263, Inconel® 718. The second superalloy may be selected from nickel-based superalloys having any of the following commercial references: Waspaloy®, Inconel® 738. The table below gives the weights content ranges of aluminum and titanium in these nickel-based commercial superalloys.

|  | aluminum (wt %) | titanium (wt %) |
|---|---|---|
| first superalloy | | |
| C-263 | 0.3-0.6 | 1.9-2.4 |
| Inconel ® 718 | 0.2-0.8 | 0.65-1.15 |
| second superalloy | | |
| Waspaloy ® | 1.2-1.6 | 2.75-3.25 |
| Inconel ® 738 | 3.2-3.7 | 3.2-3.7 |

FIG. 2B is an enlarged view of FIG. 2A showing the second portion 14. Three layers of the radial portion 16 are shown: a first layer 16a, a second layer 16b, and a third layer 16c. The second portion 14 thus comprises at least the first, second, and third layers 16a, 16b, and 16c. The first layer 16a is the layer connecting the first and second portions 12 and 14 together, the second layer 16b is situated between the first and third layers 16a and 16c. In accordance with an embodiment of the invention, the first layer 16a comprises both the first and the second superalloys, i.e. it has a nonzero content by weight of each of these two superalloys, and it presents a content by weight of the first superalloy that is strictly greater than that content by weight of the second layer 16b and strictly less than that content by weight of the first portion 12; the second layer 16b presents a content by weight of the second superalloy that is strictly greater than that content by weight of the first layer; and the third layer 16c presents a content by weight of the first superalloy that is zero or strictly less than that content by weight of the second layer 16b, and a content by weight of the second superalloy that is strictly greater than that content by weight of the second layer. The layers 16a-16c thus serve to provide a more or less progressive composition gradient in the second portion 14 in the proximity of its junction with the first portion 12. This greatly reduces problems of thermomechanical compatibility between the first and second portions 12 and 14 that may be made of materials presenting performance and properties that are different, in particular ability to withstand creep or expansion under the effect of temperature.

In the example shown, the thickness e of each of the layers 16a-16c may be greater than or equal to 0.5 millimeters (mm), e.g. greater than or equal to 1 mm, so that the composition gradient extends over a thickness of not less than 1.5 mm, e.g. greater than or equal to 3 mm. In the example shown, the layers 16a-16c present equivalent thicknesses e, but in a variant they could present different thicknesses. In this example, the second portion 14 includes other layers directly situated on the third layer 16c (not shown in the figures), which may comprise the second superalloy only.

FIGS. 3A to 3D show various steps of a method in an implementation of the invention applied to manufacturing a casing 10 such as that described above.

Initially the first portion 12 of the casing 10 is made available, which may be obtained by any known means, e.g. by additive manufacturing, by casting, or by forging.

Thereafter, the second portion 14 is deposited on the first portion 12, and more particularly on a surface 18 of the first portion 12. In the example shown, the surface 18 a situated on an inside face of the casing 10. In accordance with an embodiment of the invention, in order to deposit the second portion 14, a direct metal deposition (DMD) method is used. In the example shown, a laser metal deposition (LMD) method is used. A deposition head 20 is fed with metal powder by first and second supplies 22 and 24. The first supply 22 contains a powder of the first superalloy A, while the second supply 24 contains a powder of the second superalloy B. In this example, the deposition head 20 is configured to form a jet of powder that is focused on a laser beam so as to deposit drops of molten metal. The deposition head 20 is also configured to deposit a mixture of the powders contained in the supplies 22 and 24 so as to deposit layers that contain a controlled mixture of the first and second superalloys A and B.

Figure 3A:
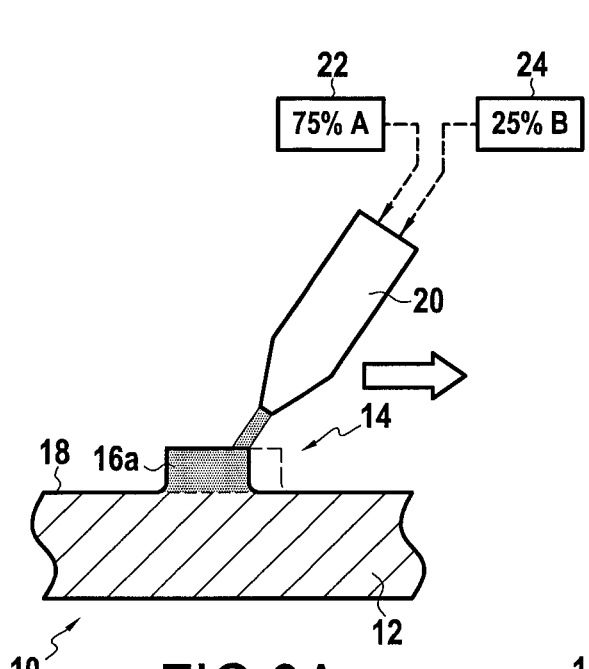
FIGS. 3A to 3D show various steps in an implementation of the invention.
Figure 3B:
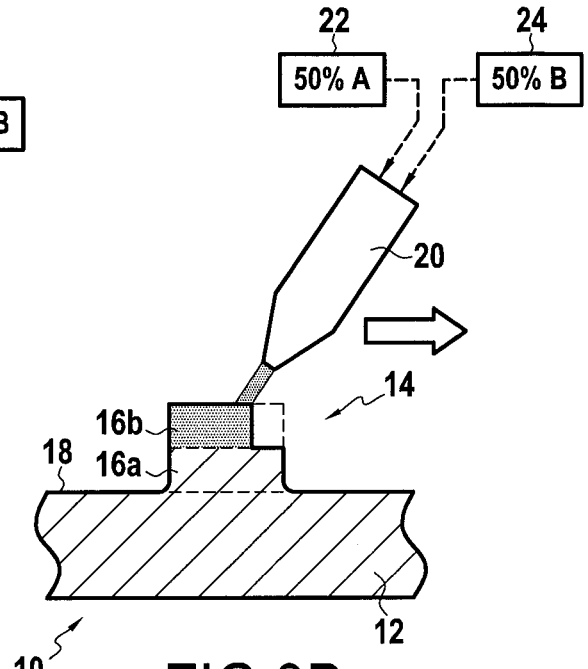
Figure 3C:
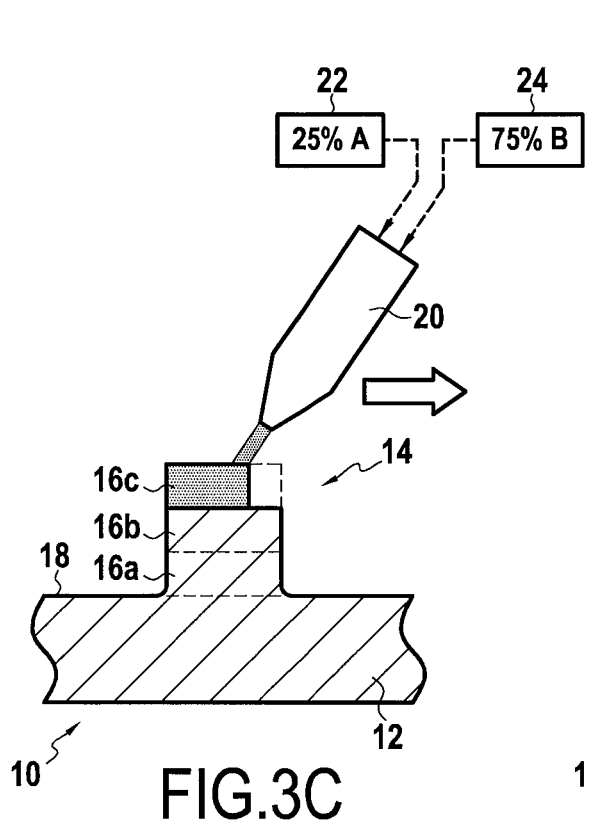

The step of depositing the second portion 14 comprises depositing the first layer 16a (FIG. 3A) on the surface 18 of the first portion 12. In the presently illustrated example, the first layer 16a is constituted by 75% by weight of the first superalloy A and by 25% by weight of the second superalloy B. Thereafter the deposition step also includes depositing the second layer 16b on the first layer 16a (FIG. 3B). In the presently illustrated example, the second layer 16b is constituted by 50% by weight of the first superalloy A and by 50% by weight of the second superalloy B. In the example shown, a third layer 16c is deposited on the second layer 16b and likewise comprises a mixture of the superalloys A and B. In particular, the third layer 16c is constituted by 25% by weight of the first superalloy A and by 75% by weight of the second superalloy B.

Figure 3D:
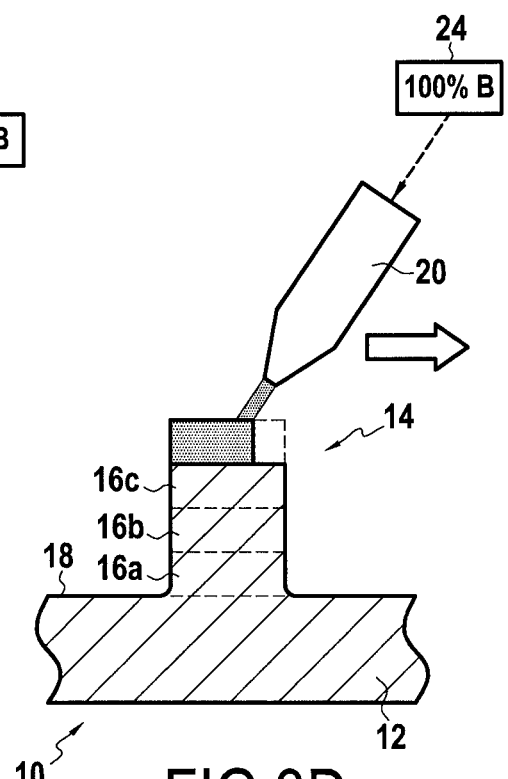

Finally, FIG. 3D shows the beginning of depositing the remainder of the second portion 14, and in particular the remainder of its radial portion 16. In order to continue depositing the second portion 14, it is thus possible to make use of the second superalloy B only.

During the step of depositing the second portion 14 on the first portion 12, it can be beneficial to heat the surface 18 onto which the second portion 14 is deposited in order to control the temperature gradient and avoid the layers cooling too quickly. By way of example, the surface 18 may be heated to a temperature lying in the range 400° C. to 800° C. This heating may be performed by induction by positioning an induction heating coil or ("inductor"), e.g. a circular inductor, around the surface 18 that is to be heated.

The method of an embodiment of the invention thus enables a part to be obtained in the form of a single piece having portions constituted by different superalloys, and to do so in a manner that is simpler and less expensive than with known methods.

It should be observed that in the example of this disclosure, for reasons of simplification, the term "layer" is used to designate a zone of the part that extends over a given thickness and that is constituted by a single material or material mixture. A layer can thus be made using a plurality of passes of the deposition head while it continues to deposit the same material or material mixture.

Throughout the disclosure, the term "lying in the range . . . to . . . " should be understood as including the bounds.

The invention claimed is:

1. A method of manufacturing a superalloy part, the part comprising a first portion comprising a majority by weight of a first superalloy and a second portion comprising a majority by weight of a second superalloy different from the first superalloy, the second portion extending from the first portion, the method comprising depositing the second portion on a surface of the first portion by a direct metal deposition method, deposition of the second portion comprising at least depositing a first layer on said surface, then depositing a second layer on the first layer, the first layer comprising the first and second superalloys, the first layer presenting a content by weight of the first superalloy that is strictly greater than that content by weight of the second layer and strictly less than that content by weight of the first portion, the second layer presenting a content by weight of the second superalloy that is strictly greater than that content by weight of the first layer;

wherein the first portion of the part constitutes at least a portion of a gas turbine casing and the second portion of the part constituting an attachment portion for attaching a ring sector or a sealing portion, the second portion extending radially towards the inside of said casing.

2. The method according to claim 1, wherein depositing the second portion comprises depositing a third layer on the second layer, the third layer presenting a content by weight of the first superalloy that is zero or strictly less than that content by weight of the second layer, and a content by weight of the second superalloy that is strictly greater than that content by weight of the second layer.

3. The method according to claim 1, wherein the first and second superalloys are nickel-based superalloys presenting nonzero contents by weight of titanium and of aluminum, the sum of the contents by weight of aluminum and of titanium in the first superalloy being strictly less than 3%, and the sum of the contents by weight of aluminum and of titanium in the second superalloy being greater than or equal to 3%.

4. The method according to claim 3, wherein the first superalloy is a nickel-based superalloy presenting a content by weight of aluminum lying in the range 0.1% to 0.9% and a content by weight of titanium lying in the range 0.5% to 2.5%, and the second superalloy is a nickel-based superalloy presenting a content by weight of aluminum lying in the range 1% to 4.8% and a content by weight of titanium lying in the range 2.6% to 4%.

5. The method according to claim 1, wherein during the step of depositing the second portion on the surface of the first portion of the part, said surface is heated to a temperature lying in the range 400° C. to 800° C.

6. The method according to claim 5, wherein the surface of the first portion is heated by induction.

7. The method according to claim 1, wherein the second portion is deposited by laser metal deposition or by electron beam metal deposition.

8. The method according to claim 1, wherein the first portion of the part is obtained by casting or by additive manufacturing.

9. The method according to claim 1, wherein the first portion of the part is obtained by forging.

10. The method according to claim 1, wherein the second super-alloy is a nickel-based super-alloy presenting a content by weight of aluminum lying in the range 1% to 4.8% and a content by weight of titanium lying in the range 2.6% to 4%.

11. The method according to claim 1, wherein the first super-alloy is a nickel-based super-alloy presenting a content by weight of aluminum lying in the range 0.1% to 0.9% and a content by weight of titanium lying in the range 0.5% to 2.5% and the second super-alloy is a nickel-based super-alloy presenting a content by weight of aluminum lying in the range 1% to 4.8% and a content by weight of titanium lying in the range 2.6% to 4%.

* * * * *